Patented Sept. 10, 1935

2,014,139

UNITED STATES PATENT OFFICE 2,014,139

COLLOIDAL SUSPENSIONS SUITABLE FOR INSECTICIDES

Ernest Charles Large, North Acton, London, England, assignor to Electro Chemical Processes Limited, London, England, a British company No Drawing. Application June 26, 1933, Serial No. 677,689. In Great Britain July 9, 1932

8 Claims. (Cl. 167—14)

This invention is for improvements in or relating to colloidal suspensions suitable for insecticides and relates particularly to an aqueous colloidal suspension of barium silico fluoride, although other insoluble silico fluorides and also cryolite are included in the invention.

It is well known that barium silico fluoride has valuable properties as an insecticide having about the same toxicity to biting insects as the ordinary acid lead arsenate but having the great advantage over lead arsenate in that it has a very much lower toxicity than lead arsenate to higher animals.

It has previously been proposed to prepare barium silico fluoride in the form of a fine powder to be applied by dusting or by spraying a simple suspension in water or other liquid vehicle. This method of employing barium silico fluoride as an insecticide has certain disadvantages owing to the high specific gravity of the material making it difficult to distribute and spread, and suspensions hitherto prepared settle very rapidly.

It is an object of the present invention to produce a colloidal suspension of an insoluble silico fluoride particularly barium silico fluoride, or of cryolite which will remain suspended indefinitely.

In its broadest aspect the present invention comprises a process for preparing an aqueous colloidal suspension of an insoluble silico fluoride (for example, barium silico fluoride) or of cryolite, which consists in agitating a mixture of the silico fluoride or of the cryolite in an aqueous liquid with a protective colloid. It has been found, however, that a suspension of greater stability, particularly in the case of barium silico fluoride, may be obtained if the agitation with the protective colloid is effected in the presence of a barium salt of a weaker acid than hydrofluosilicic acid, for example, in the presence of barium carbonate.

It has been found that barium silico fluoride prepared by different methods produces different crystalline forms of the salt and certain crystalline forms, which are easily recognized under the microscope as coffin-shaped crystals do not lend themselves easily to colloidal disintegration. It is not quite clear what conditions are essential for producing the best crystalline form of the silico fluoride but a product prepared by precipitation of hydrofluosilicic acid with barium carbonate gives a structure of crystals which on microscopic examination appear to be in the form of small rosette shaped aggregates of acicular crystals. These are particularly suitable for the purpose of the invention.

In a preferred form of the invention, therefore, the barium silico fluoride selected is in this particular physical condition.

In addition to the sulphite lye normally employed as the protective colloid it has been found advantageous to add a small proportion (for example, 0.2% of the total volume of suspension) of sodium caseinate. This has the effect of thickening the suspension and avoiding the formation of hard sediment even after very prolonged periods of standing.

In one specific form of the invention a process for preparing a colloidal suspension of barium silico fluoride comprises kneading a stiff paste of the silico fluoride in the physical condition above described, sulphite lye, a small proportion (for example 5%) of barium carbonate and if desired a small proportion (for example 0.2%) of sodium caseinate.

It is not quite certain what action the barium carbonate or other barium salt of a weaker acid than the hydrofluosilicic acid plays in the process, but it is known that barium silico fluoride is hydrolyzed in the presence of water, a saturated solution having a pH value of 3.4. It is therefore probable that barium carbonate acting upon the hydrofluosilicic acid produced by hydroylsis shifts the equilibrium point nearer to the undissociated barium silico fluoride. However this may be, suspensions produced without the aid of barium carbonate were found frequently to settle out completely after a very short time of standing. There is also an advantage in reducing acidity of the suspension in that for insecticidal purposes there is less tendency to "scorching" of the plant.

The following is a specific example of one method of carrying out the invention. 950 grams of barium silico fluoride prepared from barium carbonate and hydrofluosilicic acid were mixed with 250 grams of sediment from previous workings 160 grams of sulphite lye and 0.4 grams of sodium caseinate. As soon as the sulphite lye was distributed more or less evenly throughout the mass 40 grams of barium carbonate and 70 cc. of water were added and the material was kneaded together until a stiff homogeneous paste was formed. For this purpose any of the ordinary kneading machines are suitable. Water was then worked into the stiff paste until a thin cream was formed and the whole was then diluted until it contained about 50% of liquid. It was found that about 10% only of the material separated out when the suspension was allowed to stand for several days.

The invention also includes colloidal suspensions of barium silico fluoride when prepared by the process hereinbefore described.

While the specific example has been described with relation to barium silico fluoride the process is applicable to the preparation of colloidal suspensions of other insoluble silico fluorides and also of cryolite which have insecticidal properties comparable with those of barium silico fluoride.

I claim:—

1. A process for the production of a colloidal suspension of barium silico fluoride which comprises the step of kneading as an aqueous paste a mixture of barium silico fluoride in an aqueous liquid with sulphite lye and a small proportion of a barium salt of a weaker acid than hydrofluosilicic acid.

2. A process for the production of a colloidal suspension of barium silico fluoride which comprises the step of kneading as an aqueous paste a mixture of the barium silico fluoride in an aqueous liquid with sulphite lye and a small proportion of barium carbonate.

3. A process for the production of a colloidal suspension of barium silico fluoride which comprises the step of kneading as an aqueous paste a mixture of the barium silico fluoride in an aqueous liquid with sulphite lye, a small proportion of a barium salt of a weaker acid than hydrofluosilicic acid and a small proportion of sodium caseinate.

4. A process for the production of an aqueous colloidal suspension of barium silico fluoride which comprises the step of kneading a stiff aqueous paste of barium silico fluoride in the form of rosette-shaped aggregates of acicular crystals, sulphite lye, a small proportion of barium carbonate and a small proportion of sodium caseinate.

5. A process for the production of an aqueous colloidal suspension of barium silico fluoride which comprises the step of kneading a stiff aqueous paste of barium silico fluoride in the form of rosette-shaped aggregates of acicular crystals, sulphite lye, 5% of barium carbonate and 0.2% of sodium caseinate.

6. A process for the production of an aqueous barium silico fluoride colloidal suspension of barium silico fluoride which comprises the steps of mixing 950 parts by weight of barium silico fluoride, prepared from barium carbonate and hydrofluosilicic acid, 250 parts by weight of sediment from previous workings, 160 parts by weight of sulphite lye and 0.4 parts by weight of sodium caseinate, and after the sulphite lye is distributed throughout the mass adding 40 parts by weight of barium carbonate, 70 parts by weight of water and kneading the whole together until a stiff homogeneous paste is formed, and diluting this paste with water.

7. An insecticidal preparation comprising an aqueous colloidal suspension of barium silico fluoride, sulphite lye, barium carbonate and sodium caseinate.

8. A process for the production of an aqueous insecticidal preparation comprising kneading an insoluble complex fluoride of the class including barium silico fluoride and cryolite, a proportion of sulphite lye, and a small proportion of a barium salt of an acid weaker than hydrofluosilicic acid, into a stiff aqueous paste and then diluting with water the paste so formed.

ERNEST CHARLES LARGE.